United States Patent
Chen et al.

(10) Patent No.: US 10,136,223 B1
(45) Date of Patent: Nov. 20, 2018

(54) CONTROL METHOD AND CONTROL SYSTEM FOR AUDIO DEVICE

(71) Applicant: REALTEK SEMICONDUCTOR CORPORATION, Hsinchu (TW)

(72) Inventors: Hsing-Lun Chen, Hsinchu (TW); Shu-Yeh Chiu, Hsinchu (TW); Ko-Wei Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/964,500

(22) Filed: Apr. 27, 2018

(30) Foreign Application Priority Data

May 19, 2017 (TW) .............................. 106116562 A

(51) Int. Cl.
*H04R 5/04* (2006.01)
*G06F 13/38* (2006.01)
*G06F 3/16* (2006.01)

(52) U.S. Cl.
CPC ............... *H04R 5/04* (2013.01); *G06F 3/162* (2013.01); *G06F 13/385* (2013.01); *H04R 2420/09* (2013.01)

(58) Field of Classification Search
CPC ........ H04R 5/04; H01R 31/06; H01R 31/065; H01R 2420/09; G06F 13/385; G06F 1/162

USPC ............... 381/74, 75, 77, 85, 92, 80; 700/94
See application file for complete search history.

(56) References Cited

U.S. PATENT DOCUMENTS

| | | | |
|---|---|---|---|
| 7,544,089 B2 * | 6/2009 | Liu ....................... | H01R 31/065 439/502 |
| 7,747,010 B1 * | 6/2010 | Rowe ................. | H04M 1/72525 379/419 |
| 7,912,501 B2 | 3/2011 | Johnson et al. | |
| 2008/0168188 A1 * | 7/2008 | Yue ......................... | G06F 9/445 710/15 |

* cited by examiner

*Primary Examiner* — Melur Ramakrishnaiah
(74) *Attorney, Agent, or Firm* — WPAT, PC

(57) ABSTRACT

A control method and a control system for an audio device are disclosed. The control method and control system are applied to a USB audio adapter that includes an analog audio interface and is connected to a host. The control method includes steps of: detecting whether the analog audio interface is connected to a target device or detecting a function of the target device, and generating a detection result accordingly; controlling the USB audio adapter to operate in a disconnected mode; and controlling the USB audio adapter to continue operating in the disconnected mode according to the detection result, or controlling, according to the detection result, the USB audio adapter to operate in a connected mode and transmit audio data to the host and/or receive audio data from the host.

20 Claims, 4 Drawing Sheets

CONTROL METHOD AND CONTROL SYSTEM FOR AUDIO DEVICE

BACKGROUND

1. Field of the Disclosure

The present disclosure generally relates to a control method and control system for an audio device, and, more particularly, to a control method and control system for a Universal Serial Bus (USB) audio adapter.

2. Description of Related Art

The function of a USB audio adapter is to convert audio signals between the USB interface and the analog audio interface. There are two common USB audio adapters: one contains two audio jacks and the other contains only one audio jack. For the application of the USB audio adapter with two audio jacks, one of the audio jacks is dedicated to audio output devices such as headphones, and the other is dedicated to audio input devices such as microphones. For the application of the USB audio adapter with only one audio jack, the audio jack supports both audio output and audio input, and so the audio jack can be connected to headphone devices, microphone devices, or headset devices. Headset devices refer generally to devices having both the headphone function and the microphone function.

After the USB audio adapter is connected to a host (e.g., a device with a USB interface such as a computer, a portable electronic product, etc.), the host enumerates the USB audio adapter as an appropriate device according to the declaration type of the USB audio adapter. More specifically, because the USB audio adapter provides at least the function of connecting to the headphone and the microphone, the host enumerates the USB audio adapter as a headset device after the USB audio adapter is connected to the host. Once enumerated, regardless of the type of the device (a pure headphone device, a pure audio output device, a pure microphone device, a pure audio input device, a headset device, a device including audio input/output, or even the audio jack is not connected to any device) that is connected to the audio jack of the USB audio adapter, the host directs the audio data to this USB audio adapter, instead of using the built-in audio devices (such as built-in speaker, microphone, etc.) for audio playback or picking up the sound. Such a design, however, may cause inconveniences to users. For example, when the device connected to the USB audio adapter is a pure headphone device, the user expects that the host still uses the built-in microphone to pick up the sound; unfortunately, the practical situation is that the host attempts to use the USB audio adapter for both picking up the sound and audio playback, thereby failing to pick up the sound.

SUMMARY

In view of the issues of the prior art, an object of the present disclosure is to provide a control method and a control system for an audio device, so as to improve the usage convenience of the audio device.

A control method for an audio device is provided. The control method is applied to a Universal Serial Bus (USB) audio adapter that includes an analog audio interface and is connected to a host. The control method includes steps of: detecting whether the analog audio interface is connected to a target device or detecting a function of the target device, and generating a detection result; controlling the USB audio adapter to operate in a disconnected mode; and controlling the USB audio adapter to continue operating in the disconnected mode according to the detection result, or controlling, according to the detection result, the USB audio adapter to operate in a connected mode and transmit audio data to the host and/or receive audio data from the host.

A control system for an audio device is also provided. The control system is applied to a USB audio adapter that includes an analog audio interface and is connected to a host. The control system includes a detection circuit and a control unit. The detection circuit, which is coupled to the analog audio interface, detects whether the analog audio interface is connected to a target device or detects a function of the target device, and generates a detection result. The control unit, which is coupled to the detection circuit, controls the USB audio adapter to operate in a disconnected mode or a connected mode. After the control unit controls the USB audio adapter to operate in the disconnected mode, the USB audio adapter continues to operate in the disconnected mode according to the detection result, or the control unit controls, according to the detection result, the USB audio adapter to operate in the connected mode and transmit audio data to the host and/or receive audio data from the host.

A control method for an audio device is also provided. The control method is applied to a USB audio adapter that includes an analog audio interface and is connected to a host. The control method includes steps of: detecting a function of a target device connected to the analog audio interface and generating a detection result; declaring the USB audio adapter according to the detection result; and controlling the USB audio adapter to operate in a disconnected mode when the USB audio adapter is declared as an audio device having only an audio output function, an audio device having only an audio input function, or an audio device having a function including audio input/output, and a connection status of the analog audio interface changes. When the detection result indicates that the target device has only the audio output function, the USB audio adapter is declared as the audio device having only the audio output function. When the detection result indicates that the target device has only the audio input function, the USB audio adapter is declared as the audio device having only the audio input function. When the detection result indicates that the target device has the function including audio input/output, the USB audio adapter is declared as the audio device having the function including audio input/output.

The control method and the control system for an audio device in this disclosure can perform dynamic enumeration according to the current usage scenario of the audio device. Compared with the prior art, the USB audio adapter utilizing the dynamic enumeration mechanism of this disclosure not only works in a manner that the user's expectations are met, but also reduces power consumption when the analog audio interface of the USB audio adapter is not connected to any device.

These and other objectives of the present disclosure no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly.

The disclosure herein includes a control method and a control system for an audio device. On account of that some or all elements of the control system could be known, the detail of such elements is omitted provided that such detail has little to do with the features of this disclosure and this omission nowhere dissatisfies the specification and enablement requirements.

Figure 1:
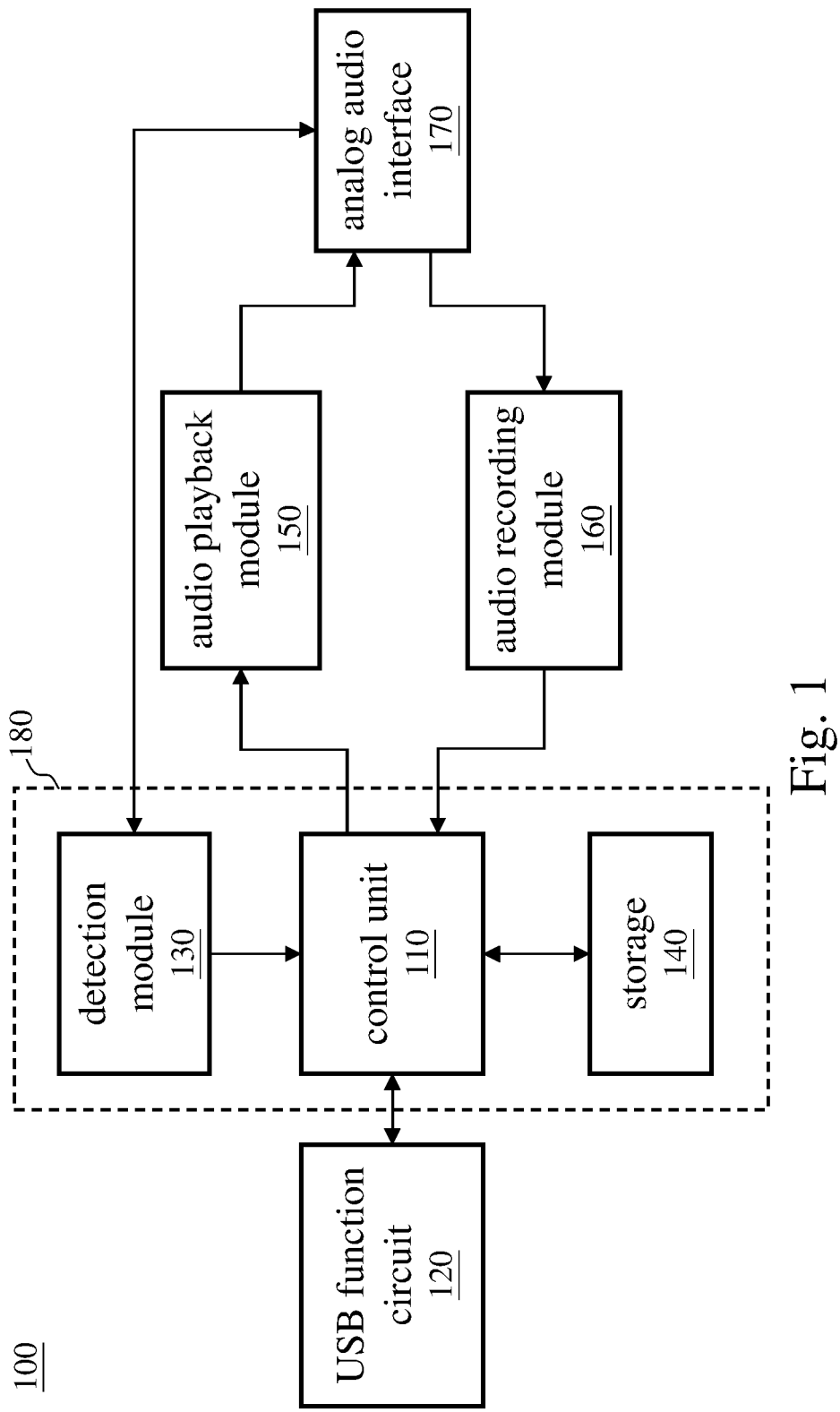
FIG. 1 illustrates the functional block diagram of a Universal Serial Bus (USB) audio adapter of this disclosure.

FIG. 1 shows the functional block diagram of a Universal Serial Bus (USB) audio adapter of this disclosure. The USB audio adapter 100 includes a control unit 110, a USB function circuit 120, a detection module 130, a storage 140, an audio playback module 150, an audio recording module 160, and an analog audio interface 170. In this disclosure, the control system 180 for the audio device includes a control unit 110, a detection module 130, and a storage 140. The analog audio interface 170 may include an audio jack and/or an audio socket. The control unit 110 may be a computing unit having a program execution capability, such as a microprocessor, a micro control unit (MCU), and the like.

The USB function circuit 120 connects the host via the USB interface for data transmission and reception. The USB function circuit 120 may include circuits for transmitting and receiving data, such as a sampling circuit, a clock circuit (e.g., a phase-locked loop (PLL), a clock and data recovery (CDR) circuit), and the like. The USB function circuit 120 changes the behavior of its internal circuit to control the USB audio adapter 100 to operate in a connected mode or a disconnected mode. For example, for the full speed mode of USB 1.0, the USB function circuit 120 can switch between the J state and the SE0 state by changing the electric potential of the pin of the USB interface. When the USB function circuit 120 is in the J state, the USB audio adapter 100 operates in the connected mode; when the USB function circuit 120 is in the SE0 state for more than 2.5 microseconds (μs), the USB audio adapter 100 enters the disconnected mode. When the USB audio adapter 100 operates in the connected mode, the host can learn that the USB audio adapter 100 is plugged in a USB port of the host, and both can transmit and receive data normally. On the other hand, when the USB audio adapter 100 operates in the disconnected mode, despite the fact that the USB audio adapter 100 is physically plugged in the USB port of the host, the host, in fact, operates as if the USB port is not connected to any USB device, meaning that there is no data transmission between the USB audio adapter 100 and the host in this instance. Driving the USB device to operate in the connected mode or the disconnected mode is a function defined by the USB specification, and is thus omitted for brevity.

The analog audio interface 170 may include at least one jack/socket that allows an analog audio plug to plug in. When the analog audio interface 170 includes only one jack/socket, the jack/socket allows an audio output device, an audio input device, or a device including audio input/output to plug in. When the analog audio interface 170 includes two jacks/sockets, one of them allows an audio output device or a device including audio input/output to plug in, while the other allows an audio input device to plug in. When the target device connected to the analog audio interface 170 has an audio output function, the audio data is transmitted from the host to the control unit 110 through the USB function circuit 120, and the control unit 110 controls the audio data to be transmitted to the target device via the audio playback module 150. The audio playback module 150 may perform digital-to-analog conversion on the audio data, and may also perform decoding operations in some applications. On the other hand, when the target device connected to the analog audio interface 170 has an audio input function, the audio recording module 160 converts the audio signal from the target device into audio data (e.g., perform analog-to-digital conversion, and may also perform encoding operations in some applications), and then the control unit 110 transmits the audio data to the host through the USB function circuit 120.

The detection module 130 detects whether a target device is plugged in the analog audio interface 170 and detects the type of the target device when the target device is plugged in the analog audio interface 170. The types of the target device include an audio output device, an audio input device, and a device including audio input/output. According to the detection result of the detection module 130, the control unit 110 controls the declaration type that the USB audio adapter 100 declares to the host, and selectively disables the USB function circuit 120, the audio playback module 150, and the audio recording module 160. The storage 140 stores multiple sets of device description data, each corresponds to a declaration type. Each set of device description data includes multiple descriptors, such as device descriptors, configuration descriptors, interface descriptors, and endpoint descriptors. During enumeration, the host enumerates, according to the device description data, the USB audio adapter 100 as the declaration type that the control unit 110 selects. The declaration types include an audio device with audio output function only, an audio device with audio input function only, and an audio device with both audio input and output functions.

Figure 2A:
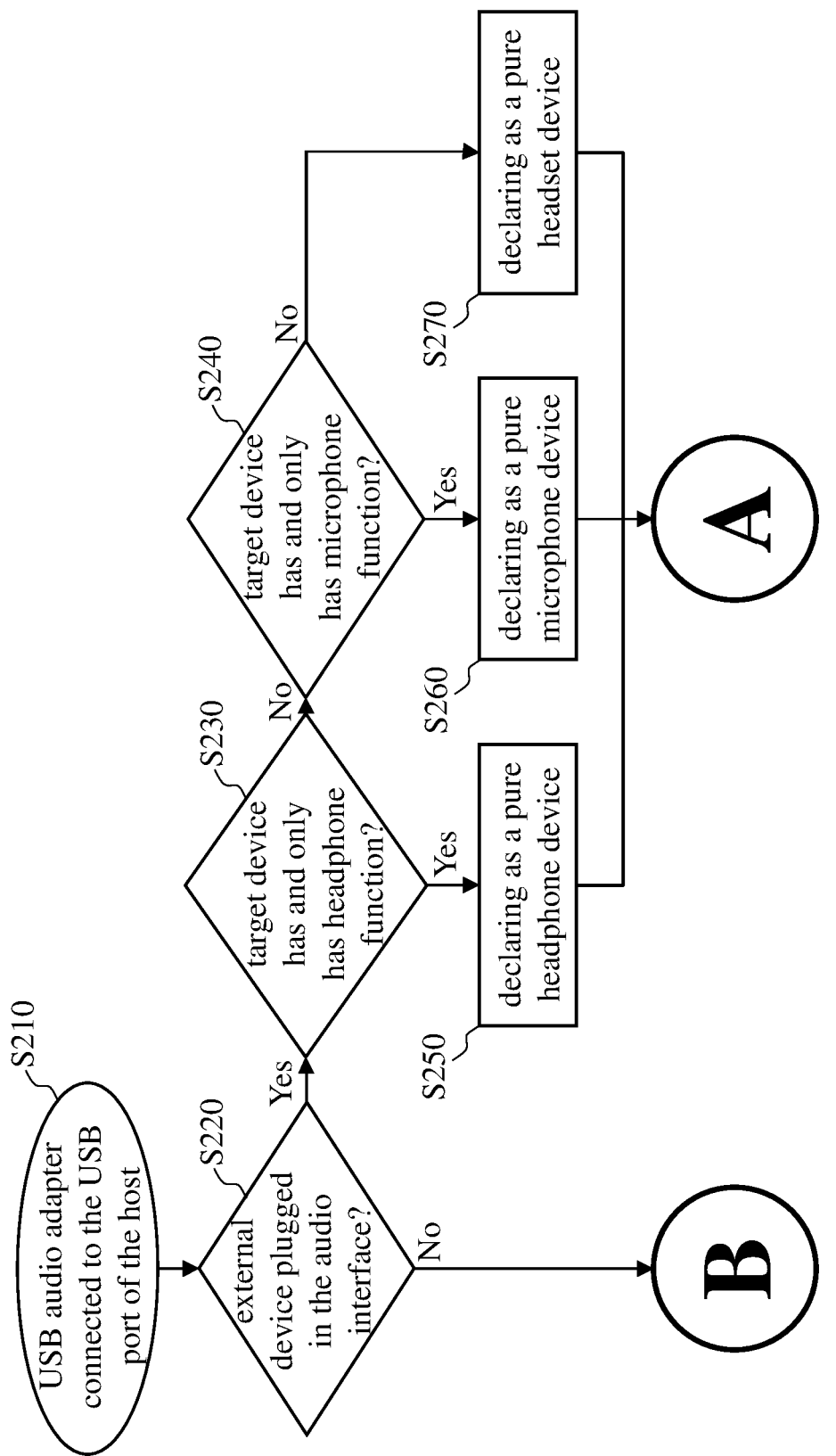
FIGS. 2A-2C illustrate flowcharts of a control method for an audio device.
Figure 2B:
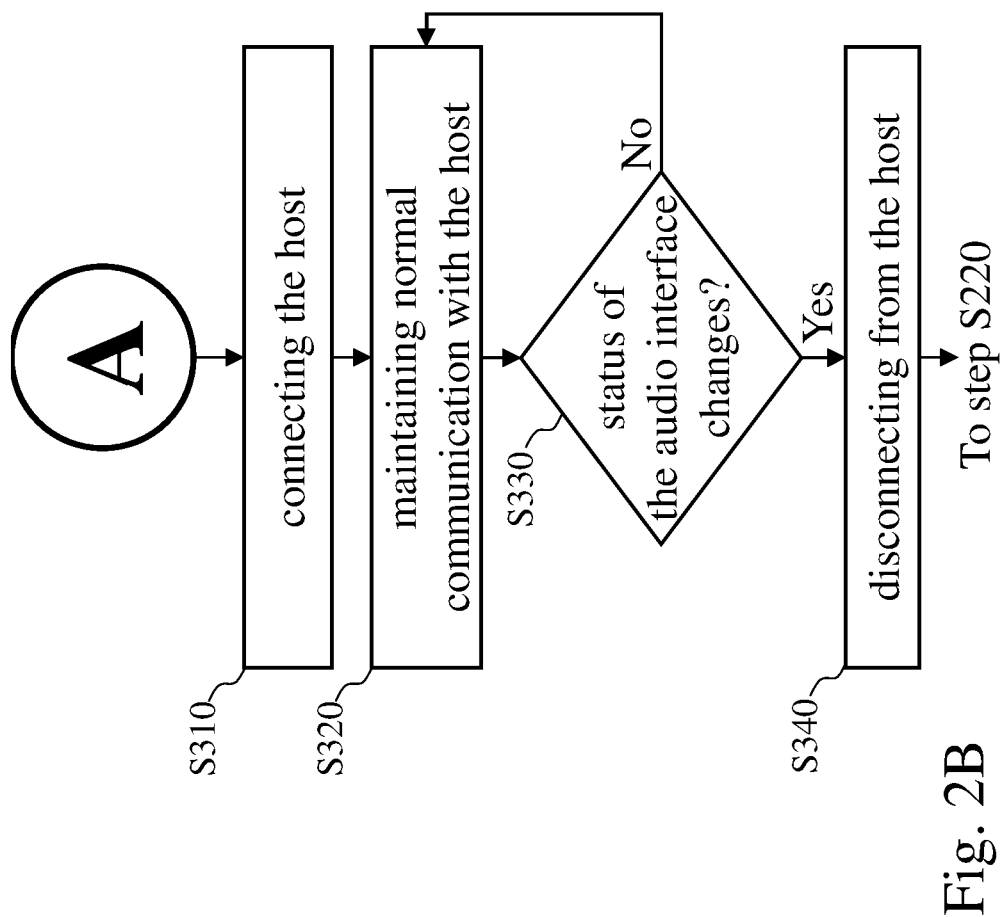
Figure 2C:
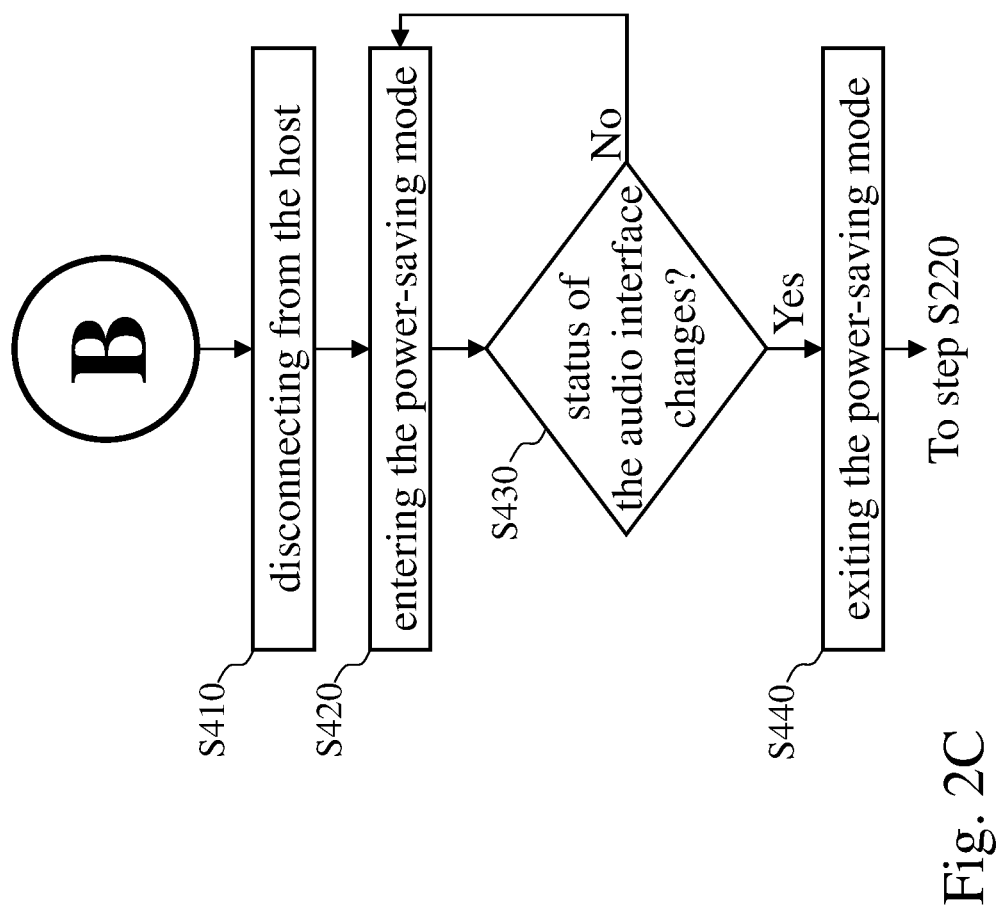

FIGS. 2A to 2C are flowcharts of a control method for an audio device. As shown in FIG. 2A, after the USB audio adapter 100 is plugged in the USB port of the host (step S210), the host powers the USB audio adapter 100 and enumerates the USB audio adapter 100 to confirm the functions and properties of the USB audio adapter 100. On the other hand, after the USB audio adapter 100 receives power, the detection module 130 starts to detect whether any target device is plugged in the analog audio interface 170 (step S220). The detection manner in step S220 may be (1) mechanical detection, for example, detecting whether the elastic plate in the analog audio interface 170 is pushed; if the elastic plate is pushed, the determination result in step S220 is positive; (2) impedance detection, for example, detecting whether the impedance between two metal plates in the analog audio interface 170 is a high impedance; if not, the determination result in step S220 is positive; or (3) user-defined, that is, the detection module 130 is directly informed of the status by an external event (such as a switch). These three detection manners are well known to those of ordinary skill in the art and the details are thus omitted for brevity.

When the determination result in step S220 is positive, the detection module 130 detects in step S230 whether the target device has the audio output function only (for example, the target device is a pure headphone device), and detects in step S240 whether the target device has the audio input function only (for example, the target device is a pure microphone device). After that, the control unit 110 determines the declaration type of the USB audio adapter 100 (step S250, S260 or S270) according to the detection result of the detection module 130; the detection result indicates that the target device has the audio output function only, the audio input function only, or the function including audio input/output. Note that to identify a target device as a pure headphone device, a pure microphone device, a headset device, or other audio devices is prior art and can be implemented by hardware, firmware, or a combination of the two. When implemented by hardware, the detection module 130 is a circuit. When implemented by firmware, the storage 140 stores multiple program instructions or codes, and the detection module 130 executes the program instructions or codes to realize the functions of the detection module 130. The detection module 130 can detect whether the device has a microphone function by at least the following methods: (1) detecting the impedance of the target device; (2) providing the analog audio interface 170 with a voltage, and detecting the voltage change; or (3) directly defined by the user, that is, the detection module 130 is directly informed of the state by an external device. Steps S220 to S240 are applicable to the case in which the analog audio interface 170 has only one or more than one jack/socket; this modification can be readily known by those skilled in the art, and the detailed descriptions are omitted for brevity.

In steps S250 to S270, the control unit 110 selects a corresponding set of device description data among multiple sets of device description data from the storage 140 according to the detection result of the detection module 130; that is, these steps determine a corresponding declaration type. In other words, the control unit 110 declares, according to the detection result, the USB audio adapter 100 as one of the audio output device, the audio input device or the device including audio input/output, or a combination of the above devices. Referring to FIG. 2B, after the control unit 110 determines the declaration type, the control unit 110 controls the USB audio adapter 100 to connect the host (step S310), causing the USB audio adapter 100 to operate in the connected mode. Note that when the USB audio adapter 100 is plugged in the USB port of the host for the first time (at this moment, the host learns that a device is plugged in the USB port), the USB audio adapter 100 operates in the connected mode, and, therefore, step S310 may be skipped and/or deemed completed. When the host learns that the USB audio adapter 100 is plugged in its USB port, the host automatically enumerates the USB audio adapter 100. After finishing the enumeration process, the host communicates with the USB audio adapter 100 according to the type that the USB audio adapter 100 declared in step S250, S260, or S270. For example, when the USB audio adapter 100 is enumerated as (or declares as) a pure audio output device, the audio data is transmitted from the host to the USB audio adapter 100, converted into an audio signal, and then transmitted through the analog audio interface 170 to the target device that has only the audio output function; in this case, the host can disable the built-in speaker but still use the built-in microphone to pick up the sound. When the USB audio adapter 100 is enumerated as (or declares as) a pure audio input device, the audio signal is transmitted to the USB audio adapter 100 through the target device that has only the audio input function, converted into audio data, and then transmitted through the USB function circuit 120 to the host; in this case, the host can disable the built-in microphone but still use the built-in speaker for audio playback. When the USB audio adapter 100 is enumerated as (or declares as) a device including audio input/output, the paths of the audio signal and the audio data are bidirectional; in this case, the host can disable the built-in speaker and microphone. Accordingly, the data flow direction of the audio data between the USB function circuit 120 and the host is associated with the declaration type.

As discussed above, the USB audio adapter 100 may make a corresponding declaration according to the type of the target device plugged in. In this way, when the host completes enumerating the USB audio adapter 100, the host may automatically determine whether to play and/or receive audio signals with a built-in audio device or the target device according to the current declaration type of the USB audio adapter 100. More specifically, despite the fact that the USB audio adapter 100 can be connected to an audio output device, an audio input device, or a device including audio input/output, the disclosed dynamic enumeration/declaration mechanism enables the host to adaptively decide to enable or disable the built-in audio device according to the type of the target device currently connected to the USB audio adapter 100. As a result, the operations of audio playback and picking up the sound can meet the user's expectations.

After connecting with the host, in step S320, the USB audio adapter 100 maintains normal communication with the host (receiving audio data from the host, transmitting the audio data to the host, or performing both at the same time) until the detection module 130 detects that the connection status of the analog audio interface 170 changes (step S330). More specifically, when any jack/socket of the analog audio interface 170 changes from connecting with a target device to not connecting with any target device or vice versa, the determination result of step S330 is positive. When the status of the analog audio interface 170 changes, the control unit 110 controls the USB function circuit 120 to cause the USB audio adapter 100 to operate in the disconnected mode (step S340). More specifically, in step S340, the USB audio adapter 100 is not physically unplugged from the USB port of the host; instead, the control unit 110 controls the USB function circuit 120 to cause the USB audio adapter 100 to switch from the connected mode to the disconnected mode to simulate the unplugging operation. After the USB audio adapter 100 is disconnected from the host, the process goes back to step S220.

When the determination result in step S220 is negative, the detection result of the detection module 130 indicates that no target device is plugged in the jack/socket of the analog audio interface 170 at this moment. Next, referring to FIG. 2C, the control unit 110 controls the USB function circuit 120 to cause the USB audio adapter 100 to operate in the disconnected mode (step S410). If the USB audio adapter 100 was in the disconnected mode before step S410, the USB audio adapter 100 is controlled to remain in the disconnected mode in step S410. Because the USB audio adapter 100 operates in the disconnected mode at this moment, the host does not enumerate the USB audio adapter 100. Next, the USB audio adapter 100 enters the power-saving mode (step S420). More specifically, in the power-saving mode, the control unit 110 turns off the USB function circuit 120, the audio playback module 150, and the audio recording module 160; in other words, in the power-saving mode the USB function circuit 120, the audio playback module 150, and the audio recording module 160 are suspended in order to reduce the power consumption of the USB audio adapter 100. Preferably, in the power-saving mode, the control unit 110 may enter a sleep mode or a low power consumption mode to further reduce the power consumption of the USB audio adapter 100. More specifically, in the sleep mode or the low power consumption mode, the control unit 110 controls the firmware to remain in a state immediately before the sleep mode or the low power consumption mode. After the control unit 110 is waked up (for example, being waked up by an interrupt sent from the detection module 130), the firmware can continue from the state to resume the tasks. In step S420, the USB audio adapter 100 operates in the disconnected mode.

In the next step S430, the detection module 130 detects whether the connection status of the analog audio interface 170 changes. The detail of step S430 is substantially the same as that of step S330. It should be noted that, if the control unit 110 enters the sleep mode or the low power consumption mode in step S420, step S430 is completely executed by hardware (i.e., the detection module 130 is implemented by circuits); if, on the other hand, the control unit 110 does not enter the sleep mode or the low power consumption mode in step S420, step S430 may be executed by hardware and/or firmware (i.e., the detection module 130 is implemented by circuits and/or programs). The USB audio adapter 100 continues to operate in the power-saving mode until the status of the analog audio interface 170 changes (i.e., step S430 is determined to be positive). In step S440, the control unit 110 controls the USB audio adapter 100 to exit the power-saving mode. More specifically, the control unit 110 turns on the USB function circuit 120, the audio playback module 150, and the audio recording module 160; in other words, the USB function circuit 120, the audio playback module 150, and the audio recording module 160 resume normal operation. The flow then goes back to step S220.

As discussed above, part of the modules or circuits of the USB audio adapter 100 is in a zero-power-consumption state in the power-saving mode. Ideally, in the power-saving mode, only the detection module 130 consumes a small amount of power. Therefore, when the analog audio interface 170 of the USB audio adapter 100 is not connected to any target device, the USB audio adapter 100 consumes little power. When the power of the host is limited (e.g., the host is a battery-powered portable electronic device), the USB audio adapter 100 that implements this mechanism does not place an extra burden on the host.

In addition, the control unit 110 may selectively turn off the audio playback module 150 or the audio recording module 160 in step S320 according to the declaration type. For example, when the USB audio adapter 100 declares as a pure audio output device, the audio recording module 160 is in an idle state, and thus the control unit 110 can turn off the audio recording module 160 to reduce power consumption.

The detection module 130, the audio playback module 150, and the audio recording module 160 can be implemented by circuitry, hardware, software, and/or firmware. When these modules are implemented by software or firmware, the control unit 110 may execute program codes or instructions stored in the storage 140 to perform the functions of each module.

Note that there is no step sequence limitation for the method embodiments as long as the execution of each step is applicable. Furthermore, the shape, size, and ratio of any element and the step sequence of any flow chart in the disclosed figures are exemplary for understanding, not for limiting the scope of this disclosure. The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A control method for an audio device, the control method being applied to a Universal Serial Bus (USB) audio adapter that comprises an analog audio interface and is connected to a host, the control method comprising:
   detecting whether the analog audio interface is connected to a target device or detecting a function of the target device, and generating a detection result;
   controlling the USB audio adapter to operate in a disconnected mode; and
   controlling the USB audio adapter to continue operating in the disconnected mode according to the detection result, or controlling, according to the detection result, the USB audio adapter to operate in a connected mode and transmit audio data to the host and/or receive audio data from the host.

2. The control method of claim 1, wherein the USB audio adapter further comprises a storage that stores a plurality of sets of device description data, the method further comprising:
   selecting one of the sets of device description data according to the detection result;
   wherein a data flow direction of the audio data between the USB audio adapter and the host is associated with the selected set of device description data.

3. The control method of claim 2 further comprising:
   controlling the USB audio adapter to receive the audio data from the host when the target device has only an audio output function;
   wherein the selected set of device description data corresponds to a pure headphone device or an audio output device.

4. The control method of claim 2 further comprising:
   controlling the USB audio adapter to transmit the audio data to the host when the target device has only an audio input function;
   wherein the selected set of device description data corresponds to a pure microphone device or an audio input device.

5. The control method of claim 2 further comprising:
   controlling the USB audio adapter to transmit the audio data to the host and receive the audio data from the host when the target device has a function comprising audio input/output;
   wherein the selected set of device description data corresponds to a device comprising audio input/output.

6. The control method of claim 1, wherein the USB audio adapter further comprises a USB function circuit, an audio playback module, and an audio recording module, the method further comprising:
   the USB audio adapter continuing to operate in the disconnected mode and controlling the USB function circuit, the audio playback module, and the audio recording mode to suspend operation when the analog audio interface of the USB audio adapter is not connected to any target device.

7. The control method of claim 1 further comprising:
   controlling the USB audio adapter to operate in the connected mode when the detection result indicates that the analog audio interface is connected to the target device.

8. The control method of claim 1 further comprising:
   controlling the USB audio adapter to operate in the disconnected mode when the detection result indicates that a connection status of the analog audio interface changes.

9. A control system for an audio device, the control system being applied to a Universal Serial Bus (USB) audio adapter that comprises an analog audio interface and is connected to a host, the control system comprising:
  a detection circuit, coupled to the analog audio interface, detecting whether the analog audio interface is connected to a target device or detecting a function of the target device, and generating a detection result; and
  a control unit, coupled to the detection circuit, controlling the USB audio adapter to operate in a disconnected mode or a connected mode;
  wherein after the control unit controls the USB audio adapter to operate in the disconnected mode, the USB audio adapter continues to operate in the disconnected mode according to the detection result, or the control unit controls, according to the detection result, the USB audio adapter to operate in the connected mode and transmit audio data to the host and/or receive audio data from the host.

10. The control system of claim 9 further comprising:
  a storage, coupled to the control unit, storing a plurality of sets of device description data;
  wherein the control unit selects one of the sets of device description data according to the detection result, and the data flow direction of the audio data between the USB audio adapter and the host is associated with the selected set of device description data.

11. The control system of claim 10, wherein when the target device has only an audio output function, the selected set of device description data corresponds to a pure audio output device, and the USB audio adapter receives the audio data from the host.

12. The control system of claim 10, wherein when the target device has only an audio input function, the selected set of device description data corresponds to an audio input device, and the USB audio adapter transmits the audio data to the host.

13. The control system of claim 10, wherein when the target device has a function comprising audio input/output, the selected set of device description data corresponds to a device comprising audio input/output, and the USB audio adapter transmits the audio data to the host and receives the audio data from the host.

14. The control system of claim 9, wherein the USB audio adapter further comprises a USB function circuit, an audio playback module, and an audio recording module, and when the analog audio interface of the USB audio adapter is not connected to any target device, the USB audio adapter continues to operate in the disconnected mode, and the control unit controls the USB function circuit, the audio playback module, and the audio recording mode to suspend operation.

15. The control system of claim 9, wherein when the detection result indicates that the analog audio interface is connected to the target device, the control unit controls the USB audio adapter to operate in the connected mode.

16. The control system of claim 9, wherein when the detection result indicates that a connection status of the analog audio interface changes, the control unit controls the USB audio adapter to operate in the disconnected mode.

17. A control method for an audio device, the control method being applied to a Universal Serial Bus (USB) audio adapter that comprises an analog audio interface and is connected to a host, the control method comprising:
  detecting a function of a target device connected to the analog audio interface and generating a detection result;
  declaring the USB audio adapter according to the detection result, wherein when the detection result indicates that the target device has only an audio output function, the USB audio adapter is declared as an audio device having only an audio output function, when the detection result indicates that the target device has only an audio input function, the USB audio adapter is declared as an audio device having only an audio input function, or when the detection result indicates that the target device has a function comprising audio input/output, the USB audio adapter is declared as an audio device having a function comprising audio input/output; and
  controlling the USB audio adapter to operate in a disconnected mode when the USB audio adapter is declared as the audio device having only the audio output function, the audio device having only the audio input function, or the audio device having the function comprising audio input/output, and a connection status of the analog audio interface changes.

18. The control method of claim 17 further comprising:
  controlling the USB audio adapter to operate in a connected mode when the detection result indicates that the analog audio interface is connected to the target device and the USB audio adapter operates in the disconnected mode.

19. The control method of claim 17 further comprising:
  controlling the USB audio adapter to operate in the disconnected mode when no target device being connected to the analog audio interface is detected.

20. The control method of claim 19, wherein the USB audio adapter further comprises a USB function circuit, an audio playback module, and an audio recording module, the USB function circuit processes transmission and reception of data between the USB audio adapter and the host, the audio playback module converts audio data received from the host into a first analog audio signal and transmits the first analog audio signal to the target device through the analog audio interface, and the audio recording module converts a second analog audio signal received from the target device into audio data, the method further comprising following step when the analog audio interface being not connected to any target device is detected:
  turning off the USB function circuit, the audio playback module, and the audio recording module.

* * * * *